No. 771,540.

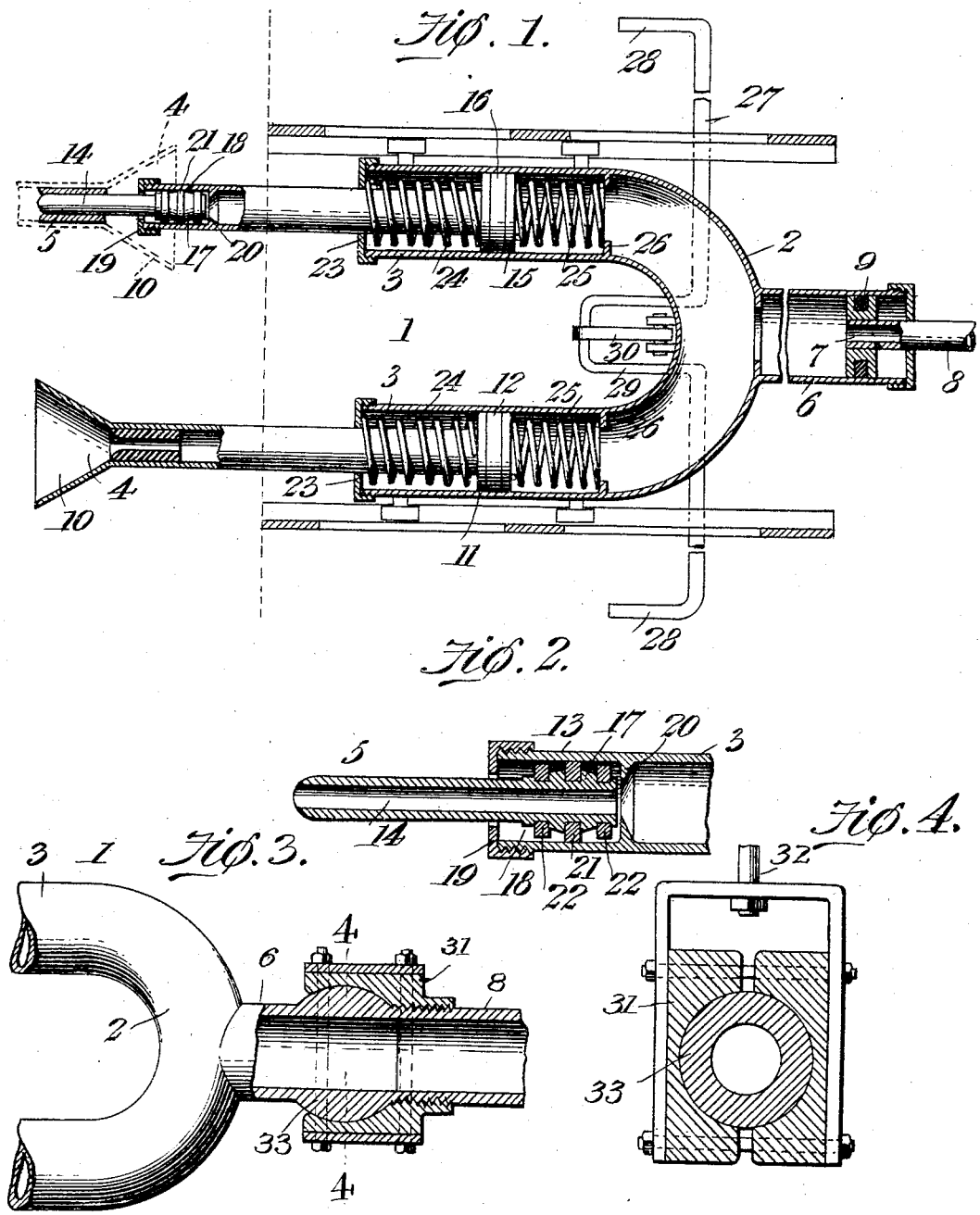

Patented October 4, 1904.

UNITED STATES PATENT OFFICE.

THOMAS M. D. EARHEART, OF PARKWOOD, ALABAMA.

TRAIN-PIPE COUPLING.

SPECIFICATION forming part of Letters Patent No. 771,540, dated October 4, 1904.

Application filed February 13, 1904. Serial No. 193,444. (No model.)

*To all whom it may concern:*

Be it known that I, THOMAS M. D. EARHEART, a citizen of the United States, residing at Parkwood, in the county of Jefferson and State of Alabama, have invented a new and useful Train-Pipe Coupling, of which the following is a specification.

My invention relates to train-pipe couplings, and has for its objects to produce a comparatively simple inexpensive device of this character in which the coupling members connecting the pipe-sections are adapted for a variety of movements, whereby they will readily conform to the various relative movements of the cars.

With these and other objects in view the invention comprises the novel features of construction and combination of parts more fully hereinafter described.

In the accompanying drawings, Figure 1 is a sectional plan showing a pair of the members in coupled engagement and illustrating one form of embodiment of the invention. Fig. 2 is a horizontal section, on an enlarged scale, illustrative of the manner of connecting the sections of the nozzle. Figs. 3 and 4 are detail views illustrative of a slightly-modified form of embodiment of the invention, Fig. 4 being partly in section taken on the line 4 4 of Fig. 3.

Referring to the drawings, it will be seen that the coupling devices 1, which are identical in construction and operation and but one of which is described in detail, each comprises a substantially U-shaped tubular connecting member or carrier 2, the forwardly-extending branches or cylinders 3 of which sustain, respectively, a female coupling member 4 and a male coupling member or nozzle 5.

The carrier 2, which constitutes a connection between the coupling members and train-pipe and also a duct for the passage of air from the latter to the former, is provided with a centrally-disposed rearward tubular extension or cylinder 6, designed for the reception of a coupling-head 7, provided upon the end of the train-pipe section 8, said head having a suitable packing-ring 9 and being adapted for movement or play longitudinally of the cylinder 6, whereby the coupling device 1 may, as a whole, conform to the relative longitudinal movement of the cars.

The female member 4, which is preferably in the form of a suitable length of tubing, is provided at its forward end with a flaring or substantially bell-shaped mouth 10 and at its rear end with a coupling-head or piston 11, disposed within and designed for movement or play longitudinally of one of the cylindrical extensions 3, said head being provided with a rubber packing-gasket 12 to bear upon the inner surface of the cylinder and prevent passage of air between the parts.

The male member or nozzle 5, which is designed to enter and fit snugly within the member 4 of the companion coupling device, is of tubular form and preferably comprises a primary section 13 and a secondary section 14, coupled for relative movement, as hereinafter described, said nozzle being provided at its rear end with a coupling head or piston 15, disposed within and designed for movement longitudinally of the other cylindrical extension 3, said head having a packing ring or gasket 16, similar to and performing the same office as gasket 12. The secondary section 14 of male member 5 is provided at its inner end with a head 17, seated in a chamber 18 at the forward end of section 13, the terminal of which latter is closed by a removable cap 19, while in rear of the head there is provided a bearing flange or abutment 20, all as seen more clearly in Fig. 2. The head 17, which tapers conically from its center toward its ends, which are of reduced diameter, is provided at its enlarged center with a packing-gasket 21 and adjacent its ends with similar gaskets 22, these gaskets serving to maintain the head air-tight within the chamber 18 and at the same time cushion the head in its movements. It is obvious from this arrangement that the section 14 is susceptible of a slight amount of longitudinal play and also of considerable lateral play relative to the section 13 during the passage of the cars around curves.

The outer ends of cylinders or extensions 3 are closed by removable caps 23, which permit the insertion or removal of the coupling members and also serve as bearings for normally expanded springs 24, disposed in advance of the heads of the coupling members, while in rear of the latter there are disposed expanded springs 25, having bearing at their rear ends upon bearing flanges or abutments 26, provided in rear of the extensions 3. These springs 24 25, which yield under the longitudinal movements of the coupling members in conforming to the movements of the cars, serve to return the members or maintain them in normal position.

Each coupling device 1 is movable back and forth beneath the car to operative or inoperative position by means of a crank-shaft 27, journaled for rotation beneath the car and having at its ends operating arms or levers 28, the crank-bend 29 of the shaft being engaged by one end of an operating rod or element 30, the other end of which is operatively connected with the carrier 2. It is apparent that in practice when the shaft 27 is rocked in one direction the coupling device will be moved rearward to an inoperative position beneath the car, and when rocked in the opposite direction the coupling members will be extended from beneath the car to an operative or coupling position. This arrangement permits of the coupling members being moved to a position where they will be free from wear and liability of becoming damaged when not actually in use.

Attention is especially directed to the fact that owing to the air passage or opening through the members 4 and 5 being of smaller diameter than that of the extensions 3 the compressed air in passing from said extensions through the coupling members will act upon the heads 11 15 for pressing the members 2 and maintaining them in coupled engagement.

In Figs. 3 and 4 I have illustrated a slight modification in the matter of connecting the carrier with the train-pipe. In this form of the device the end of the train-pipe 8 is in threaded engagement with a socketed head or hanger 31, suspended by a bolt 32 or otherwise beneath the car, the carrier 2 being provided upon its extension 6 with a spherical enlargement or ball 33, adapted to fit and have universal movement within the socket of head 31. In other respects the construction and operation is identical with that above described.

From the foregoing it will be seen that I produce a simple inexpensive device which is admirably adapted for the attainment of the ends in view; but it is to be understood that I do not wish to be limited or confined to the precise details herein set forth, inasmuch as minor changes may be made without departing from the spirit of the invention. For example, the coupling-heads 11 15 instead of being of the form herein shown may be constructed similar to the head 17 without defeating their function or operation.

Having thus described the invention, what is claimed is—

1. In a device of the class described, the combination with a carrier having a pair of tubular extensions, of male and female coupling members telescopically connected respectively with said extensions for longitudinal movement, bearing-heads provided on the members within the extensions, and cushioning-springs disposed in rear and advance of the respective heads.

2. In a device of the class described, the combination with a train-pipe, of a carrier slidably connected therewith, a coupling member carried by the carrier, and a rock-shaft having a crank-bend operatively connected with the carrier and operable for moving the latter longitudinally to advance or retreat the coupling member.

3. In a device of the class described, the combination with a carrier having a tubular extension, of a coupling member telescopically connected therewith and provided with a bearing-head disposed within the extension, and cushioning-springs arranged in rear and advance of the bearing-head.

In testimony that I claim the foregoing as my own I have hereto affixed my signature in the presence of two witnesses.

THOMAS M. D. EARHEART.

Witnesses:
W. C. MORRIS,
HERMAN HORN.